United States Patent [19]
Taneya et al.

[11] 4,146,456
[45] Mar. 27, 1979

[54] PROCESS FOR ADJUSTING THE ASH BALANCE OF COW'S MILK AND OTHER MILKS AND SIMULTANEOUSLY REMOVING MINERALS FROM THE SAME

[75] Inventors: Shinichi Taneya, Tachikawa; Kensuke Itoh, Kodaira; Yasunobu Hiraoka, Iruma; Hiroji Motomura, Shinnanyo; Yoshinori Matsunaga, Kudamatsu; Gosei Kawanishi, Ichikawa; Tsutomu Nakamura, Tokyo; Shigeru Hayashi, Kawagoe, all of Japan

[73] Assignees: Snow Brand Milk Products Co., Ltd., Hokkaido; Tokuyama Soda Kabushiki Kaisha, Yamaguchi, both of Japan

[21] Appl. No.: 861,711

[22] Filed: Dec. 19, 1977

[30] Foreign Application Priority Data
Dec. 23, 1976 [JP] Japan .......................... 51/154269

[51] Int. Cl.² .................. B01D 13/02; A 23C 21/00
[52] U.S. Cl. ....................... 204/180 P; 204/301; 424/34; 424/41; 424/44
[58] Field of Search ....................... 204/180 P, 204/301; 424/34, 41, 44

[56] References Cited
U.S. PATENT DOCUMENTS

| | | | |
|---|---|---|---|
| 3,544,436 | 12/1970 | Francis et al. | 204/180 P |
| 3,595,766 | 7/1971 | Scheder | 204/180 P |
| 3,595,769 | 7/1971 | Scheder | 204/180 P |
| 3,687,682 | 8/1972 | Scheder | 204/180 P X |
| 3,767,548 | 10/1973 | Okada et al. | 204/180 P |
| 3,905,886 | 9/1975 | Wang | 204/180 P |

OTHER PUBLICATIONS

Wilson, "Demineralization by Electroanalysis", (1960).

*Primary Examiner*—Arthur C. Prescott
*Attorney, Agent, or Firm*—Kane, Dalsimer, Kane, Sullivan and Kurucz

[57] ABSTRACT

Cow's milk and/or its analogues are demineralized and the ash balance thereof adjusted with ion-exchange membrane electrodialysis apparatus. The method comprises demineralizing cow's milk or its analogues in a first stage consisting of one or more of electrodialysis stacks at a demineralization rate of below 50 percent, then further demineralizing thus obtained milk in a second stage consisting of one or more of electrodialysis stacks at a demineralization rate of more than 60%, transferring thus demineralized milk to concentration compartments consisting of one or more of electrodialysis stacks of the first stage, then discharging the milk which was adjusted.

6 Claims, 1 Drawing Figure

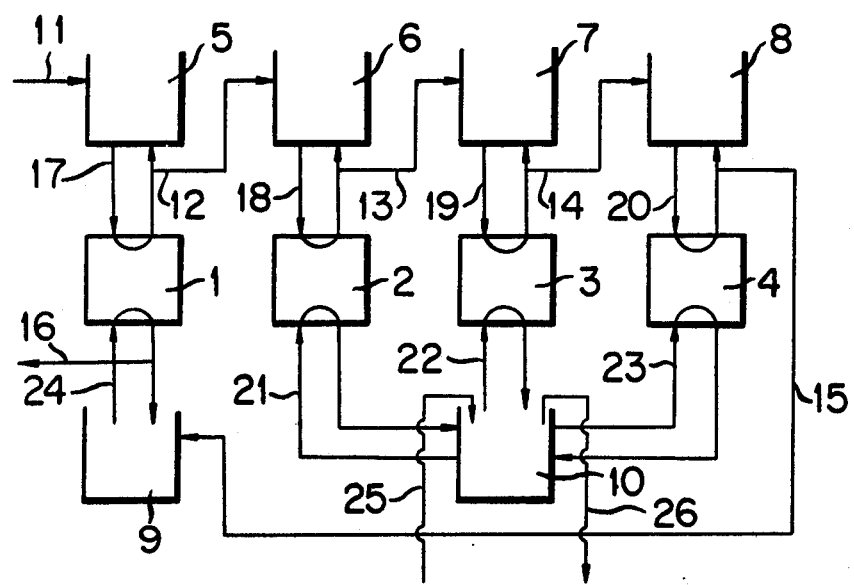

PROCESS FOR ADJUSTING THE ASH BALANCE OF COW'S MILK AND OTHER MILKS AND SIMULTANEOUSLY REMOVING MINERALS FROM THE SAME

BACKGROUND OF THE INVENTION

1. Field of the Invention

The invention relates to a process for adjusting the ash balance of cow's milk and/or other milks and simultaneously removing minerals from the same, more particularly it relates to a process for removing minerals contained in cow's milk and/or its analogues and at the same time adjusting the balance of mineral components contained in the same by means of ion-exchange membranes.

2. Brief Description of the Prior Art

In the production of cow's milk powder it is desirable to resemble its composition to that of human milk. However, the content of minerals in milk used as a material of powdered milk is higher as compared with human milk and accordingly it is required to demineralize it in the process of the production of infant milk powder.

Since demineralization by means of ion-exchange membranes does not cause an abrupt change in pH and accordingly does not cause a denaturation of proteins due to its mild demineralizing properties, it is said to be an advantageous means for demineralizing of materials containing a large amount of protein such as milk and its analogues.

The demineralization by the use of ion-exchange membranes according to the prior art is, however, merely to reduce the contents of minerals irrespective of the mineral balance contained therein and it was difficult to adjust the rate of removal of each salt component contained therein.

Accordingly when a highly demineralized milk obtained by means of ion-exchange membranes is to be used for the production of infant milk powder at present, adjusting of the desired ratio of each mineral component is attained merely by selecting the compounding ratio of milk with other materials to be added. Since, however, there is a limitation in this procedure, it is preferable to adjust the ratio of each mineral component during the demineralization process by the use of ion-exchange membranes.

SUMMARY OF THE INVENTION

After our various investigations to solve these problems as said above, we have now attained the present invention.

This invention relates to a process for adjusting ash balance as well as demineralization of cow's milk and its analogues in the demineralization process, which comprises demineralizing cow's milk and/or its analogues at a demineralization rate of below 50 percent in a first stage consisting of one or more of electrodialysis stacks, further demineralizing the partially demineralized milk until a demineralization rate of more than 60 percent occurs in a second stage consisting of one or more of electrodialysis stacks, transporting thus demineralized milk to concentration-compartments of the former stage consisting of one or more of electrodialysis stacks, and taking out the milk. The purpose of the present invention resides in providing a process for demineralizing milks as well as a process for resembling ash balance of each component of milks to those of human milk.

DETAILED DESCRIPTION OF THE INVENTION

The present invention will be further practically explained.

Milk to be demineralized according to the process of the invention includes, for example milks such as cow's milk, goat's milk, and other cattle's milk and aqueous liquid products therefrom such as skimmed milk, whey and so on and as for the analogues thereof includes, for example soya bean milk and so on.

According to the invention a demineralization apparatus provided with a first stage consisting of one or more of electrodialysis stacks and a second stage consisting of one or more of electrodialysis stacks is used.

As for the type of ion-exchange membrane electrodialysis stacks any known type thereof may be used and the electrodialysis stacks generally used for said process is composed of a plural number of compartments separated by reciprocally arranged anion-exchange membranes and cation-exchange membranes in which compartments a liquid to be deionized (diluted solution), and a liquid for concentrating ions (concentrated solution) are alternatively passed through, wherein the compartments in which the former liquid is passed through are named as demineralization compartments and the compartments in which the latter liquid is passed through are named as concentration-compartments, and both outer ends of this stack are arranged with a cathode and an anode respectively. Occasionally only cation-exchange membranes may be used as ion-exchange membrane together with neutral semipermeable membranes alternatively. The concentration-compartments and/or dilution compartments may be inserted with spacers to generate turbulence or arranged so as to create a winding or tortuous path flow along the membranes to accelerate the velocity of the flow and simultaneously to prolong the retaining time of the milk to be treated. According to the invention it is preferable to use an ion-exchange membrane electrodialysis stack of filter-press type, because by the use thereof the distances between membranes may be reduced. The examples of desirable stack of this type include for example, the stack described in U.S. Pat. No. 2,708,658, Japanese Patent Publication No. Sho 32-8165 and so on, however, it is not limited only in these types but includes also the other types of electrodialysis apparatus such as a unit cell type may be used.

According to the invention, milks and/or its analogues to be demineralized are passed through in the demineralization side (whole demineralization compartments are together designated as demineralization side) of the electrodialysis stacks of the first stage and demineralized milk and/or its analogues discharged from the demineralization side of the electrodialysis stacks of the second stage are passed through in the concentration side (whole concentration compartments are together designated as concentration side). When the first stage consisting of two or more of electrodialysis stacks is used, the liquid discharged from the demineralization side of the apparatus of the first stage is passed through so as to be introduced into the side the demineralization compartments of the second apparatus and the demineralized milk and/or its analogues discharged from the demineralization side of the latter stage, are passed through in any one of the concentration side or two or more of the concentration side (in this case the liquid discharged from the concentration side of one apparatus is passed through the concentration side of the other apparatus) of the former stage.

In the next place, milk and/or its analogues demineralized at a demineralization rate of below 50 percent, preferably from 10 to 40 percent in the demineralization side of the first stage is passed through the demineralization side of the second stage and in the concentration side of the latter stage an electrolyte solution, for example a solution of sodium chloride, potassium chloride, etc. is passed through. When the electrodialysis apparatus of the latter stage is composed of two or more stacks, the liquid discharged from the demineralization side of the first stack is passed through in the demineralization side of the second stack and also in the concentration side of each stack all the same electrolyte may be passed through, or the liquid discharged from the concentration side of the first stack may be passed through in the concentration side of the second stack. In the same manner as stated above milk to be treated is demineralized at a demineralization rate of above 60%, preferably 70–90%, and the demineralized milk is transported to the concentration side of the first stage. "The demineralization rate" herein denoted means the rate based on the amount of minerals contained in milk to be demineralized as well as to be adjusted for its ash balance.

In the electrodechamber of each electrodialysis stack electrolyte solution is used under recycling.

According to the invention cow's milk and/or its analogues are, as stated above, demineralized to a demineralization rate of below 50 percent in the demineralization side of the first stage. This is because the demineralization-inclination of monovalent ions, especially K and Cl will reduce linearly until 50 percent of demineralization rate and at the demineralization rate of 50 percent the absolute demineralization rates of K and Cl correspond to about 85 percent. The absolute demineralization rate of divalent ions and Na at this point, correspond to about 25–40 percent and it is not preferable to exceed the rate of more than 50 percent, because the demineralization rate of the divalent ions and Na will increase against the demineralized rate of K and Cl ions.

Cow's milk and/or its analogues thus demineralized in a rate of below 50 percent are subsequently further demineralized more than 60 percent of demineralized rate in the demineralization side of the second stage.

The latter stage is used to reduce the total ash content of milk by desalting unnecessary Na and multivalent ions, because even if monovalent ions except Na are almost demineralized, multivalent ions and Na may remain.

Thus demineralized milk of more than 60 percent is transported to the concentration side of the first stage in the same manner as above. By means of the treatment as stated above the obtained milk taken out from the concentration side of the first stage is that wherein the composition of salt components is adjusted.

Among monovalent ions K is a nutritionary important component and is a a large proportion in human milk. On the other hand, the amount of Na in human milk is small whereas the amount of Na in cow's milk and/or its analogues are relatively large and also the excess ingestion thereof causes a renal impediment; therefore, Na is a component especially to be demineralized. Accordingly, cow's milk and/or its analogues taken out from the concentration side of the first stage according to the invention are such wherein the composition of mineral component thereof is close to that of human milk and accordingly it is quite suitable for use as a material for the production of infant milk powder.

It is possible to adjust the ash balance of cow's milk and/or its analogues by making a branch line in the line which is used to transport the milks which were demineralized in the first stage to the material tank of the demineralization side of the first stage, and connecting the branch line to the material tank of the concentration side of the former stage, or connecting the line to the line through which the milks which were demineralized in the latter stage, is fed back to the material tank of the concentration side of the first stage.

That is to say, by mixing a part of the milks which were demineralized in the first stage and a part of the milks which was demineralized in the second stage, and using the mixture as the concentrated solution of the former stage, it is possible to adjust the ash balance of the milks in the more wider range, especially monovalent ions, K, Cl.

BRIEF EXPLANATION OF FIGURE

The Figure is the flow sheet of Examples.
FIGS. 1–4: Ion-exchange membrane electrodialysis apparatus.
FIGS. 5–8: Tank of demineralization side
FIG. 9: Tank of concentration side.
FIG. 10: Tank of concentrating liquid.
FIGS. 11–26: Conductive lines.

The present invention will be further illustrated by the following examples but not limited only in these.

EXAMPLE 1

FIG. 1 shows a flow sheet of the present example. The ion-exchange membrane electrodialysis apparatus composing the first stage consists of only one stack (1) and the same composing the second stage consists of three stacks (2)–(4). As for the ion-exchange membrane electrodialysis stack herein used, they are products of Tokuyama Soda Kabushiki Kaisha: TU-20 and ion-exchange membranes used are also products of the same company and as for anion-exchange membranes and cation-exchange membranes ACH-45T and C66-5T are used respectively. The effective area of each electrodialysis stack and the demineralization rate of each stage are shown in Table 1 and therein the effective area per the compartment is 0.2 m$^2$.

Table 1

|  | The First Stage | The Latter Stage | | |
| --- | --- | --- | --- | --- |
|  | (1) | (2) | (3) | (4) |
| Effective Area (m$^2$) (Numbers of Compartments) | 2(10 comp.) | 4(20 comp.) | 6(30 comp.) | 12(60 comp.) |
| Total Demineralization Rate (%) | 40 | 62 | 73 | 77 |

Skimmed milk employed is produced from fresh milk in Tokyo Factory of Snow Brand Milk Products Co., Ltd. At first, skimmed milk is fed through line (11) to the tank (5) of the demineralization side, then further transported through line (17) to the demineralization side having 10 demineralization compartments of the electrodialysis stack (1) of the first stage and recycled at this stage to be demineralized until a demineralization rate of 40 percent is achieved. As to the demineralization rate of the mineral components to be demineralized at this point, in the case of K and Cl it is in the range of about 75 percent and in the case of Na and others is 17–32 percent.

A part of the thus demineralized skimmed milk is transported passing through line (12) into the tank (6) of the demineralization side of the second stage and then further transferred passing through line (18) to the demineralization side having 20 demineralization-compartments of the electrodialysis stack of the latter stage (2) and is demineralized until 62 percent. Subsequently, a part of skimmed milk thus obtained is transferred passing through line (13) to the tank (7) of the demineralization side, and further transferred passing through line (19) to the demineralization side having 30 demineralization compartments (3) of the second electrodialysis stack composing the second stage where it is demineralized until 73 percent. A part of thus demineralized skimmed milk is transferred passing through line (14) to the tank (8) of the demineralization side and then further transferred passing through line (20) to the demineralization side having 60 compartments of the third electrodialysis stack (4) and there it is demineralized to the rate of 77 percent. A part of thus demineralized material is transferred passing through the line (15) to the tank (9) of the concentration side and further transferred passing through the line (24) to the concentration side having 10 concentration compartments of the electrodialysis stack (1) of the first stage and at this step minerals, especially monovalent ions of K, Cl, correspond to that of the demineralization rate of 40% from the demineralizing side are mainly transferred to the concentration side to provide a skimmed milk in which minerals have been adjusted. Thus adjusted skimmed milk is taken out from line (16). The skimmed milk obtained by the present invention compared with those obtained by the prior art is shown in Table 2.

Table 2

|  | Total Ash (%) | Mineral Content (mg/100 ml) | | | | | |
| --- | --- | --- | --- | --- | --- | --- | --- |
|  |  | Na | K | Ca | Mg | P | Cl |
| Untreated Fresh Skimmed Milk | 0.73 | 73.1 | 148 | 105 | 12.3 | 83.3 | 102 |
| Skimmed Milk according to the Invention | 0.44 | 12.6 | 113 | 66.7 | 6.42 | 40.0 | 80.2 |
| Demineralized Skimmed Milk according to the Prior Art | 0.44 | 60.0 | 33.2 | 85.0 | 10.0 | 74.5 | 22.1 |

As clear from Table 2, when compared with the demineralized skimmed milk obtained according to the prior art the demineralized skimmed milk obtained according to the invention is lower as to the contents of multivalent ions and Na and higher as to K and Cl in the mineral composition and when compared with raw skimmed milk, it is demineralized more satisfactory as to Na and not so much demineralized as to K.

The tank (10) shown in the flow sheet is that of concentration solution and the solution is recycled passing through the lines (21), (22) and (23) in the concentration compartments of the electrodialysis stacks (2), (3) and (4) composing the second stage. The concentrated solution in the tank (10) is applied while diluting by supplying water from line (25). In this example the amount of skimmed milk to be supplied is 15 l/H and the amount of water to be added to the concentration tank is about 30 l/H. Line (26) is used for overflow.

EXAMPLE 2

The procedure described in Example 1 is repeated, the number of compartments and demineralization rate are described in Table 3 and whey is used instead of skimmed milk, wherein the amount of whey to be supplied is about 25 l/H and the amount of water to be added to the tank of the concentration liquid is about 25 l/H. The obtained results are described in Table 4.

Table 3

|  | 1st Stage (1) | 2nd Stage (2) | 2nd Stage (3) | 2nd Stage (4) |
| --- | --- | --- | --- | --- |
| The Effective Area of Membrane (m$^2$) (Number of Compartments) | 6(30 compt.) | 6(30 compt.) | 12(60 compt.) | 12(60 compt.) |
| Demineralization Rate (%) | 34 | 58 | 77 | 85 |

Table 4

|  | Total Ash (%) | Mineral Contents (mg/100 ml) | | | | | |
| --- | --- | --- | --- | --- | --- | --- | --- |
|  |  | Na | K | Ca | Mg | P | Cl |
| Untreated Whey | 1.44 | 130.5 | 416.4 | 85.1 | 22.6 | 114.8 | 282.0 |
| Whey according to the Invention | 0.7 | 61.4 | 218.5 | 40.9 | 11.1 | 37.7 | 181.6 |
| Demineralized Whey according to the Prior Art | 0.7 | 72.0 | 133.0 | 62.8 | 18.5 | 88.6 | 33.0 |

(Solid matter content of the untreated whey: 19.3%)

What is claimed is:

1. A process for adjusting the ash balance of milk and/or its analogues and removing minerals from the same by the use of ion-exchange membranes, which comprises;
    demineralizing milk and/or its analogues in a first stage consisting of one or more electrodialysis stacks at a demineralization rate of below 50 percent,
    further demineralizing the demineralized milk and/or its analogues in a second stage consisting of one or more electrodialysis stacks at a demineralization rate of more than 60 percent,
    transferring the further demineralized milk and/or its analogues to the concentration side of one or more of electrodialysis stacks of the first stage and;
    discharging the milk and/or its analogues which have had the ash balance adjusted from the concentration side.

2. The process according to claim 1, wherein said milk is selected from the group consisting of cow's milk, goat's milk, milk of other cattle, skimmed milk and whey.

3. The process according to claim 1, wherein said milk-analogues are soya-bean milk and the like.

4. The process according to claim 1, wherein cation and anion exchange membranes are used alternatively.

5. The process according to claim 1, wherein cation-exchange membranes and neutral membranes are used alternatively as ion-exchange membranes.

6. Milk and its analogues which have been demineralized and the ash balance thereof adjusted according to the process of claim 1.

* * * * *